(12) United States Patent
Wang et al.

(10) Patent No.: US 8,350,202 B2
(45) Date of Patent: Jan. 8, 2013

(54) METHOD AND APPARATUS FOR ADJUSTING AND TESTING AN IMAGE SENSOR MODULE

(75) Inventors: Han-wei Wang, Tu Cheng (TW);
Tsai-sheng Shen, Tu Cheng (TW);
Jung-kuang Liu, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 315 days.

(21) Appl. No.: 12/884,061

(22) Filed: Sep. 16, 2010

(65) Prior Publication Data

US 2012/0068048 A1 Mar. 22, 2012

(51) Int. Cl.
*G02B 7/04* (2006.01)
*G01B 7/00* (2006.01)

(52) U.S. Cl. .................................. 250/201.2; 356/127
(58) Field of Classification Search .............. 250/201.5; 356/124, 127, 399, 400

See application file for complete search history.

(56) References Cited

U.S. PATENT DOCUMENTS

2004/0119836 A1* 6/2004 Kitaguchi et al. ....... 348/207.99

* cited by examiner

*Primary Examiner* — Thanh Luu
(74) *Attorney, Agent, or Firm* — Cheng-Ju Chiang

(57) ABSTRACT

A method for adjusting and testing an image sensor module is provided. The method of the present invention includes steps of: (1) calculating longitudinal and transverse deviation values of a center point of a lens relative to a standard reference position specified on a lens barrel, and an angle deviation value of the lens according to position signals of the lens on the image sensor module; (2) compensating the longitudinal and transverse deviation values of the center point of the lens, and the angle deviation value of the lens for exactly positioning the lens; and (3) adjusting focus of the image sensor module. The method of the present invention can compensate the mechanism errors produced in the mounting process of the image sensor module for conveniently and exactly adjusting the focus of the image sensor module. An apparatus for adjusting and testing an image sensor module is also provided.

6 Claims, 5 Drawing Sheets

METHOD AND APPARATUS FOR ADJUSTING AND TESTING AN IMAGE SENSOR MODULE

BACKGROUND OF THE INVENTION

1. Field of the Invention

The present invention relates to a method for adjusting and testing, and more particularly to a method and apparatus for automatically adjusting and testing an image sensor module.

2. Description of the Prior Art

At present, an image sensor module mainly includes a circuit board, an image sensor mounted on a center position of the circuit board, a lens barrel fixed to the circuit board, and a lens mounted in the lens barrel and located above the image sensor. During the mounting process of the image sensor module, after the lens is mounted in the lens barrel, it is needed to focus the lens, namely to adjust the distance between the lens and the image sensor. Prior methods for adjusting the lens mainly have two modes. A first mode is adopting manual operation for focusing. Because the manual adjusting and testing operation is varied with the different operators and the result thereof is depending on individual judgments, this manual operation inevitably can affect the consistency of the focusing quality of the image sensor module. A second mode is employing a focusing device capable of automatically focusing. This focusing device generally can make a motor control a focusing wheel mechanism moving downward until the focusing wheel mechanism engages with the lens. Then, the focusing operation need be performed again on the basis of comparing the parameters by the computer image processing technology.

Whereas, mechanism errors produced in the mounting process of the image sensor module, can affect the position of the lens relative to a standard reference position specified on the lens barrel. The second mode cannot correct or compensate the mechanism errors before focusing, so it is not convenience for the focusing device to make the focusing wheel mechanism engage with the lens. When the mechanism errors exceed a permitted limit, it is resulted that the focusing device cannot automatically adjust lens.

BRIEF SUMMARY OF THE INVENTION

An object of the present invention is to provide a method and apparatus for automatically adjusting and testing an image sensor module, which can compensate mechanism errors produced in the mounting process of the image sensor module for convenience to automatically focusing.

To achieve the above object of the present invention, a method for adjusting and testing an image sensor module is provided. The method of the present invention comprises steps of: (1) calculating longitudinal and transverse deviation values of a center point of a lens relative to a standard reference position specified on a lens barrel, and an angle deviation value of the lens according to position signals of the lens on the image sensor module; (2) compensating the longitudinal and transverse deviation values of the center point of the lens, and the angle deviation value of the lens for exactly positioning the lens; and (3) adjusting focus of the image sensor module.

To achieve the above object of the present invention, an apparatus for adjusting and testing an image sensor module is also provided. The image sensor module includes a circuit board, an image sensor mounted on a center position of the circuit board, a lens barrel fixed on the circuit board and a lens mounted in the lens barrel and located above the image sensor. The apparatus for adjusting and testing the image sensor module comprises a focusing mechanism, a stepper motor component being used to control the focusing mechanism and a controller. Wherein the focusing mechanism includes a mounting base, a supporting board fixed to the mounting base, a focusing wheel component and a focusing motor. The focusing wheel component and the focusing motor are separately fixed to two sides of the supporting board, and the focusing motor controls vertical movements of the focusing wheel component. The stepper motor component is fixedly connected to the mounting base for controlling horizontal movements of the focusing wheel component, wherein the focusing wheel component is located above the image sensor module for engaging with the lens and adjusting focus of the lens. The controller is separately connected to the image sensor module and the stepping motor component.

Based on the above description, the method and apparatus for adjusting and testing an image sensor module, as provided by the present invention, can compensate the mechanism errors produced in the mounting process of the image sensor module before focusing. Whereby the focusing wheel component can conveniently engage with the lens. Therefore the method and apparatus of the present invention can conveniently and exactly adjust the focus of the image sensor module.

DETAILED DESCRIPTION OF THE PREFERRED EMBODIMENTS

The following embodiment with reference to the accompanying drawings now has been given for detail describing the technology, the feature, the object and the effect of the present invention.

Figure 1:
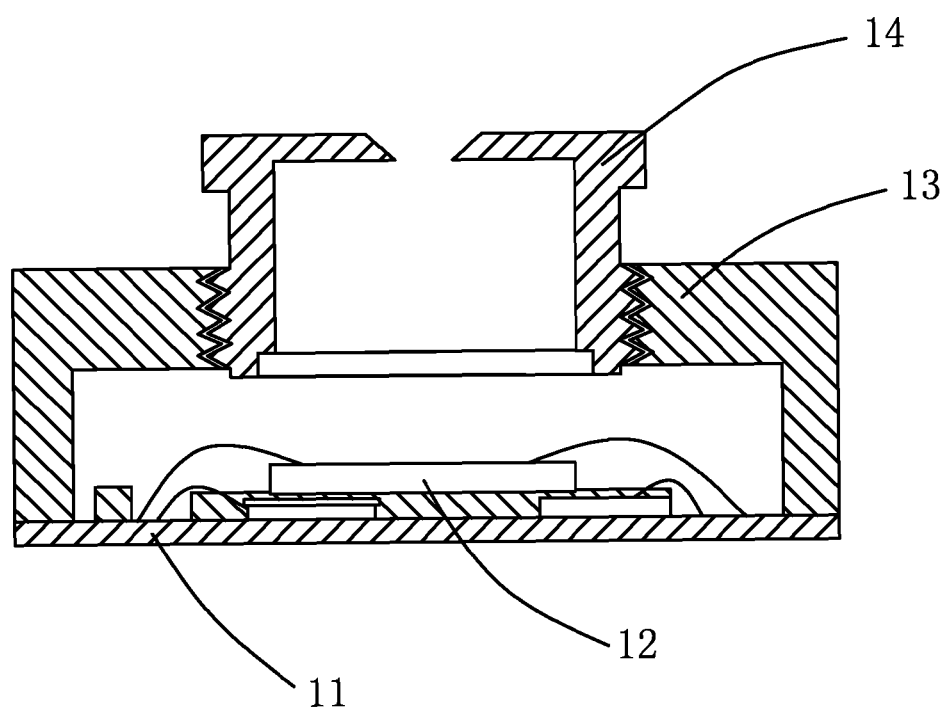
FIG. 1 is a structure schematic view of an image sensor module.

Please refer to FIG. 1, an image sensor module 10 includes a circuit board 11, an image sensor 12 mounted on a center position of the circuit board 11, a lens barrel 13 fixed on the circuit board 11, and a lens 14 mounted in the lens barrel 13 and located above the image sensor 12.

Figure 2:
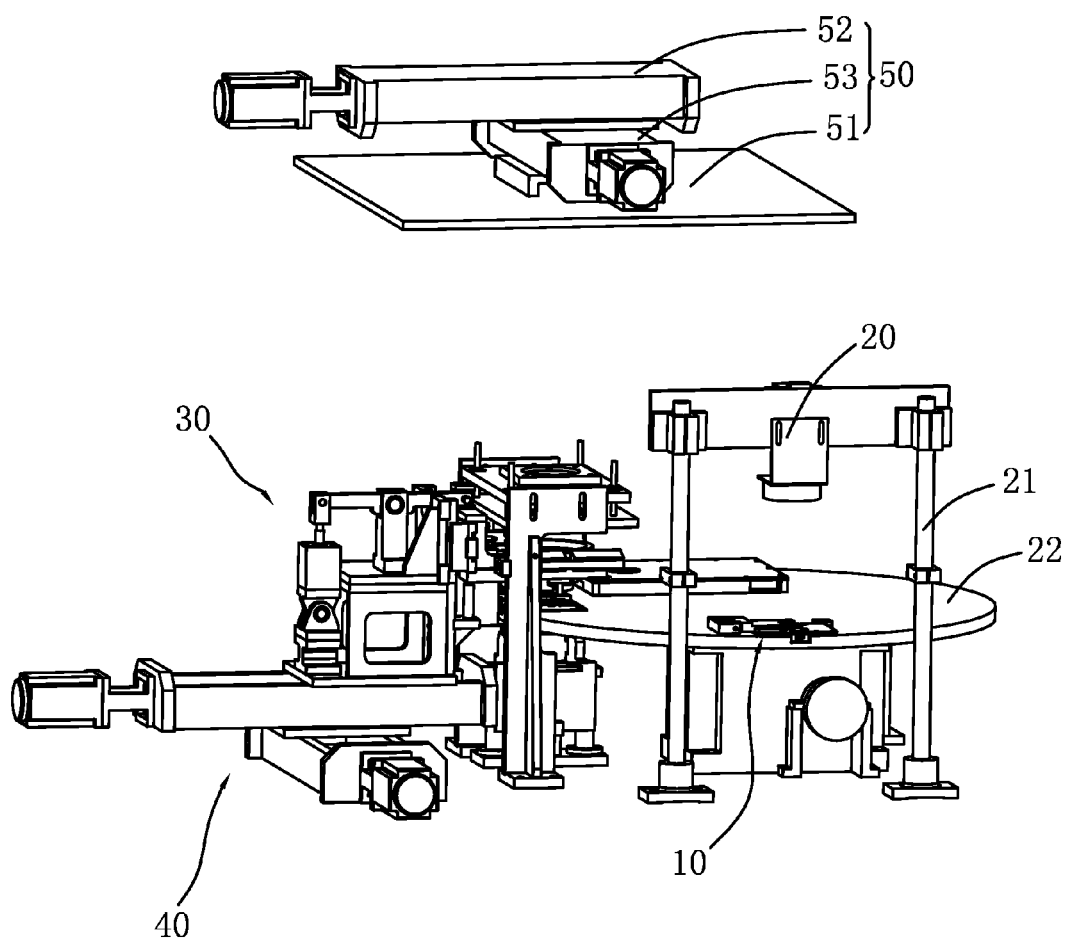
FIG. 2 is an apparatus for adjusting and testing the image sensor module according to one embodiment of the present invention.

Referring to FIG. 2, an apparatus for adjusting and testing the image sensor module 10, comprises a video camera 20, a supporting bracket 21 used to fix the video camera 20, a transferring mechanism 22, a focusing mechanism 30, a stepper motor component 40 controlling the focusing mechanism 30, and a controller (not shown in all FIGS). The supporting bracket 21 is located on one side of the periphery of the transferring mechanism 22, and the focusing mechanism 30 is located on the other side of the periphery thereof. The image sensor module 10 is fixed to the transferring mechanism 22. After the video camera 20 picks up an outside view of the image sensor module 10, the image sensor module 10 is transferred to below the focusing mechanism 30 by the transferring mechanism 22 for being ready to receive the focusing operation by the focusing mechanism 30. The controller is separately connected to the image sensor module 10 and the stepper motor component 40 for controlling their movement.

Figure 3:
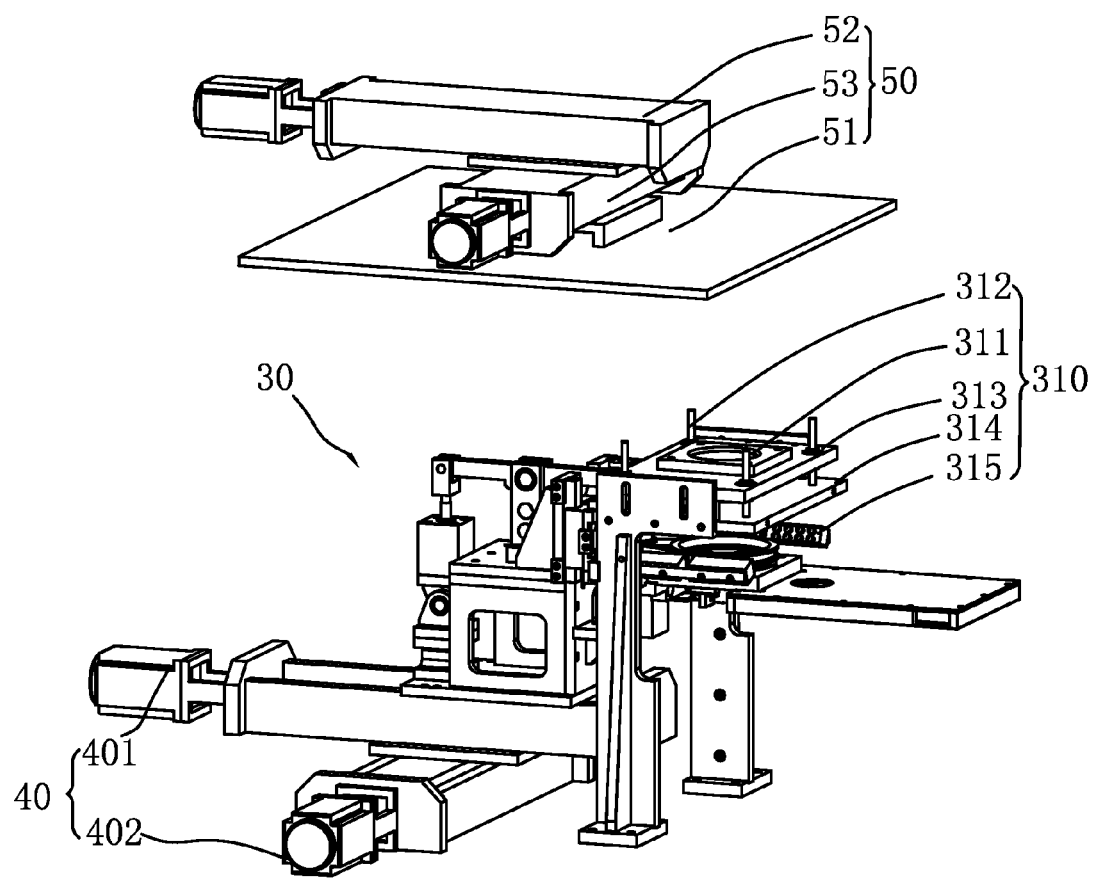
FIG. 3 is an assembly perspective view of the apparatus for adjusting and testing the image sensor module of FIG. 1, including a focusing device, a stepper motor component and a modifying component.
Figure 4:
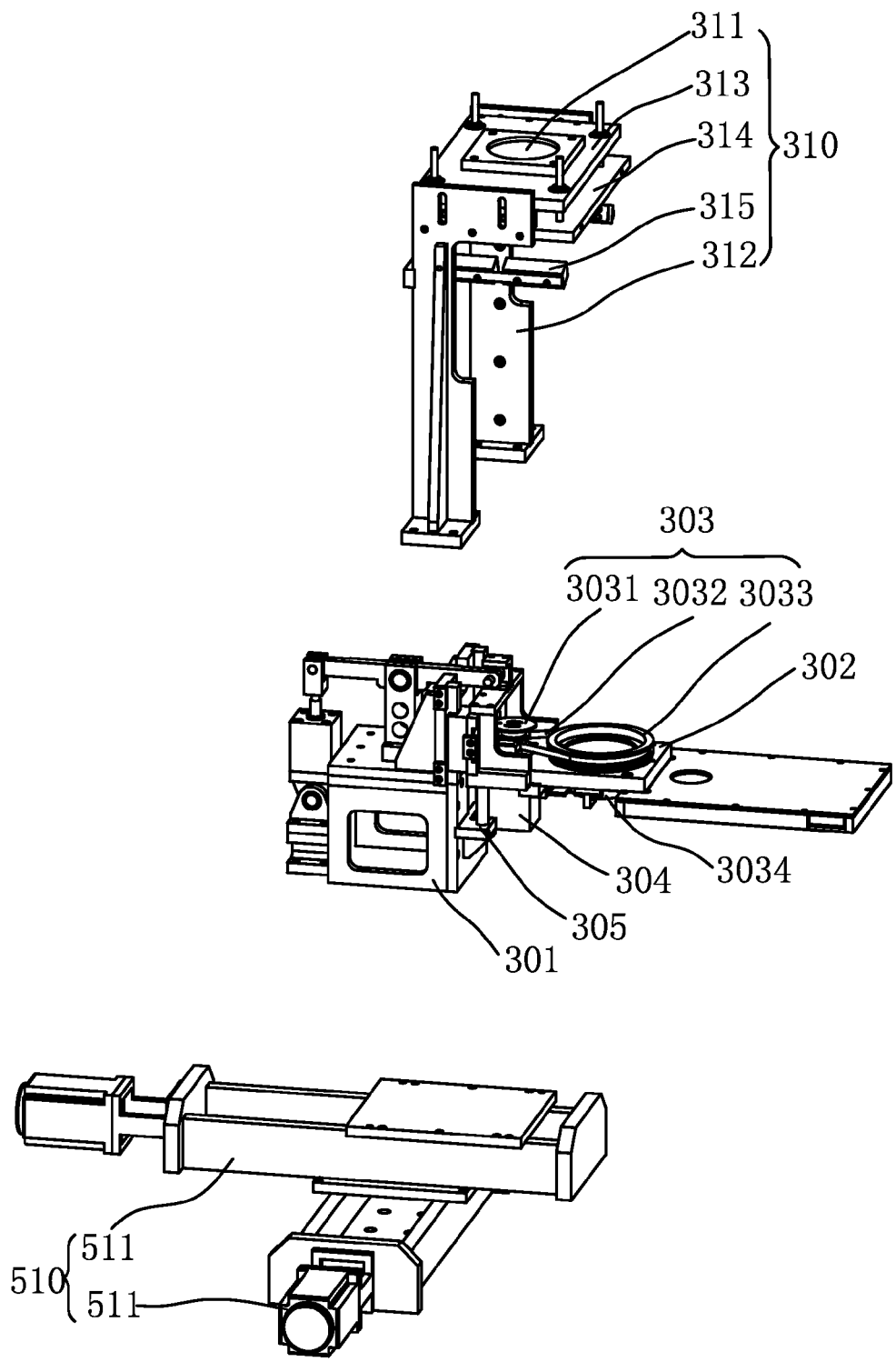
FIG. 4 is an exploded perspective view of the apparatus of FIG. 3.

Referring to FIGS. 3 and 4, the focusing mechanism 30 comprises a mounting base 301, a supporting board 302, a focusing wheel component 303 and a focusing motor 304. The focusing motor 304 is fixed to one side of the mounting base 301 by a fastening member 305. The supporting board 302 is located above the focusing motor 304 and is fixed to the mounting base 301. The focusing wheel component 303 is mounted on the supporting board 302 and can be controlled by the focusing motor 304. Specifically, the focusing wheel component 303 includes a rotary wheel 3031, a first rubber ring 3032 and a focusing wheel 3033. The rotary wheel 3031 is fixed to one end of the supporting board 302, and the focusing wheel 3033 is fixed to the other end thereof. An output shaft (not shown in all FIGS) of the focusing motor 304 is fixed to the rotary wheel 3031. One end of the first rubber ring 3032 is connected to the rotary wheel 3031, and the other end thereof is connected to the focusing wheel 3033. A focusing knob 3034 is located below the focusing wheel 3033. Specifically, the focusing motor 304 can control the rotary wheel 3031 to rotate for bringing along the focusing wheel 3033, which is connected to the rotary wheel by the first rubber ring 3032, to rotate, whereby the focusing knob 3034 fixed below the focusing wheel 3033 can be brought along to rotate, and can be given the angle compensation.

Moreover, because the focusing knob 3034 is threadedly connected to the focusing wheel 3033, the focusing knob 3034 can move downward at the same time of compensating the angle thereof. The stepper motor component 40 includes a first stepper motor 401 and a second stepper motor 402 being perpendicular to the first stepper motor 401. The first and second stepper motors 401, 402 are connected to the mounting base 301 of the focusing mechanism 30, and separately control the longitudinal and transverse movements of the focusing wheel component 303 on one horizontal plane for controlling the focusing knob 3034 to move along the longitudinal and transverse directions of the horizontal plane. Whereby deviations of the focusing knob 3034 can be compensated by the longitudinal and transverse movements thereof. Understandably, the present apparatus for adjusting and testing the image sensor module can indirectly compensate deviations of a center point of the lens 14 by directly compensating the deviations the focusing knob 3034.

Preferably, the focusing mechanism 30 further comprises a relay lens component 310, including a relay lens 311 and bearing feet 312 for loading the relay lens component 310. Specifically, the relay lens 311 is supported by an upper bearing board 313 and a lower bearing board 314, which are mounted on the bearing feet 312. Both of the two bearing boards 313, 314 have a through hole (not shown in FIG. 3) corresponding to the position of the relay lens 311. The relay lens component 310 is placed above the focusing wheel component 303. Detailedly, the relay lens 311 is positioned above the focusing wheel 3033 of the focusing wheel component 303. Plurality of illuminators 315 are mounted on two sides of the bearing feet 312 and located under the lower bearing board 314 for providing enough light during focusing.

Preferably, after completing to focusing, it is needed to test color signals of the image sensor 12 for estimating the performance thereof for picking up the color. During the package process of the image sensor module 10, a tilting error is produced between the circuit board 11 and the lens barrel 13. It is resulted that a tilting error is existed between the image sensor 12 mounted on the circuit board 11 and the lens barrel 13, and the image sensor 12 cannot pick up a whole picture. Therefore, the present apparatus for adjusting and testing the image sensor module further comprises a modifying component 50, which includes a standard panel 51, a first modifying motor 52 and a second modifying motor 53 perpendicular to the first modifying motor 52. The standard panel 51 is located above the focusing wheel component 303 and connected to the second modifying motor 53. The first and second modifying motors 52, 53 separately control the horizontal movements of the standard panel 51 along the longitudinal and transverse directions, so that the image sensor 12 can pick up the picture of the whole standard panel 51 and the performance of the image sensor 12 for picking up the color signals can be tested. Understandably, the present apparatus for adjusting and testing the image sensor module can indirectly compensate deviations of the image sensor 12 by directly compensating deviations of the standard panel 51.

Figure 5:
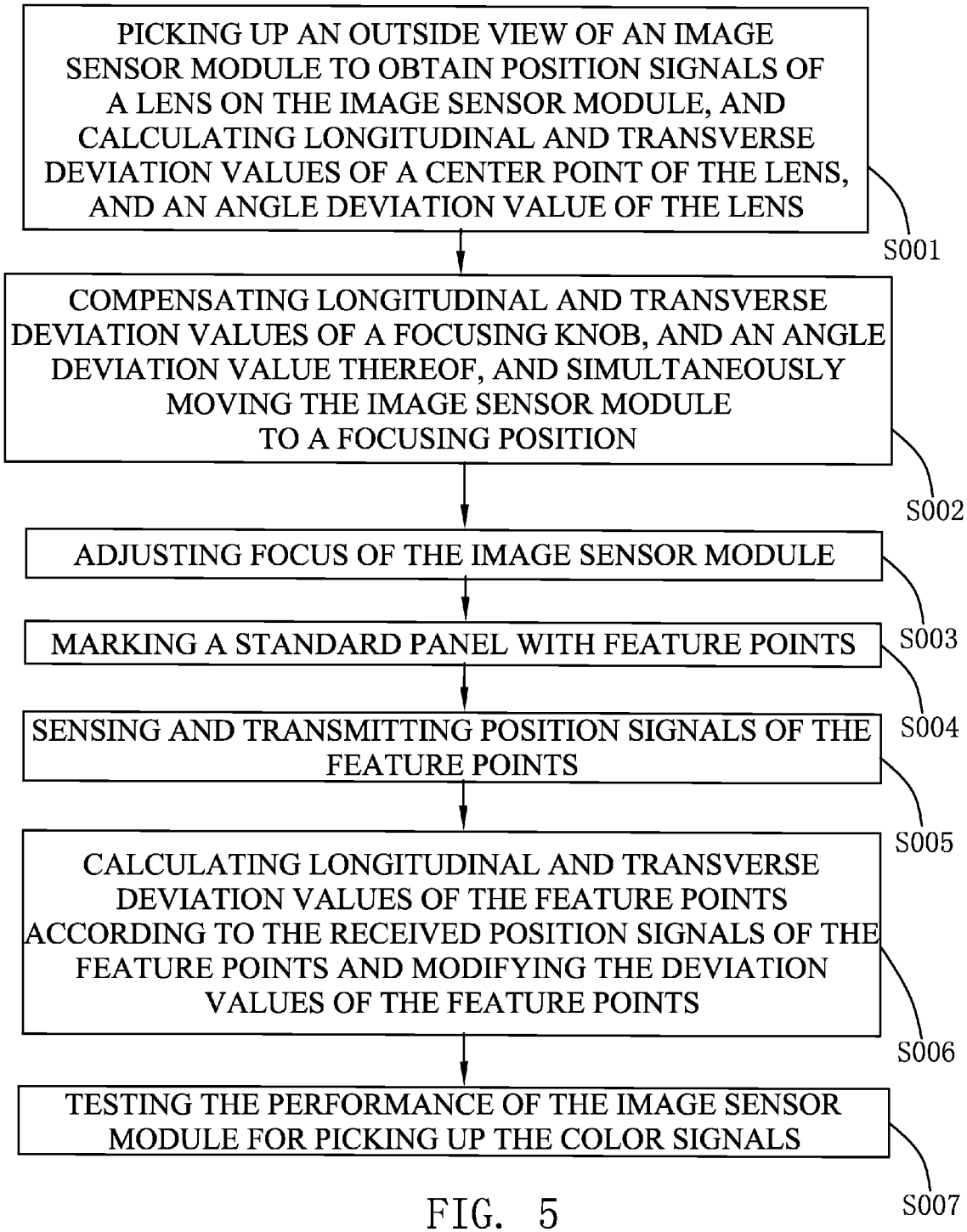
FIG. 5 is a flow diagram of a method for adjusting and testing the image sensor module according to one embodiment of the present invention.

Please refer to FIG. 5, a method for adjusting and testing the image sensor module according to the present invention includes following steps:

S001: employing the video camera 20 to pick up the outside view of the image sensor module 10 for obtaining position signals of the lens 14 on the image sensor module 10 and transmitting the position signals of the lens 14 to the controller. According to the position signals of the lens 14 on the image sensor module 10, the controller can calculate longitudinal and transverse deviation values of the center point of the lens 14 relative to a standard reference position specified on the barrel 13, and calculate an angle deviation value of the lens 14;

S002: employing the controller to control the stepper motor component for compensating the longitudinal and transverse deviation values of the focusing knob 3034, and to control the focusing motor 304 for compensating the angle deviation value of the focusing knob 3034, and to simultaneously control the transferring mechanism 22 to move the image sensor module 10 to below the focusing mechanism 30;

S003: employing the focusing mechanism 30 to rotate the lens barrel 13 for focusing;

S004: marking the standard panel 51 with feature points;

S005: employing the image sensor 12 of the image sensor module 10 to sense the feature points of the standard panel 51, and transmitting position signals of the feature points sensed by the image sensor 12 to the controller;

S006: employing the controller to calculate longitudinal and transverse deviation values of the feature points according to the received position signals of the feature points, and to control the first and second modifying motors 52, 53 for modifying the deviation values of the feature points; and S007: employing the controller to test the performance of the image sensor 12 for picking up the color signals according to an image signal, which is picked and transmitted by the image sensor 12, of the picture of the standard panel 51.

Understandably, in step S001, it also may be completed that employing the controller to control the transferring mechanism 22 for moving the image sensor module 10 to below the focusing mechanism 30.

Referring to FIGS. 1 to 5, the working principle of the present apparatus for adjusting and testing the image sensor module is as follows:

First, the video camera 20 picks up the outside view of the image sensor module 10 fixed on the transferring mechanism 22, so that the position signals of the lens 14 on image sensor module 10 can be obtained according to the outside view and can be transmitted to the controller. Simultaneously, the controller controls the transferring mechanism 22 to transfer the image sensor module 10 to below the focusing mechanism 30.

Next, the controller compares the position signals of the lens 14 with standard reference values, which are stored in the controller, of the position of the lens 14, and calculates the longitudinal and transverse deviation values, and the angle deviation value of the lens 14 relative to the standard reference values.

Then, in control of the controller, the first and second stepper motors 401, 402 separately control the focusing wheel component 303 to move along the longitudinal and transverse directions on one horizontal plane, to further control the longitudinal and transverse movements of the focusing knob 3034 on the horizontal plane for compensating the position deviations of the focusing knob 3034 relative to the lens 14. Now, the focusing motor 304 can drive the focusing knob 3034 fixed on the focusing wheel 3033 to rotate for compensating the angle deviation of the focusing knob 3034 relative to the lens 14, thereby indirectly compensating the longitudinal deviation, the transverse deviation and the angle deviation of the lens 14. At the same time of compensating the angle deviation of the focusing knob 3034, the focusing knob 3034 is moving downward until engaging with the lens barrel 13 in control of the focusing motor 304.

Next, after compensation of the angle and position, the controller controls the focusing motor 40 to make the focusing knob 3034 rotate so that the lens barrel 13 engaging with the focusing knob 3034 can be driven to rotate for adjusting the distance between the lens 14 mounted in the lens barrel 13 and the image sensor 12. Whereby the focusing process can be completed. After completion of focusing, the image sensor 12 senses the feature points marked on the standard panel 51 and transmits the position signals of the feature points to the controller.

Next, the controller compares the received position signals of the feature points with standard signals stored in the controller, for calculating the longitudinal and transverse deviation values of the feature points. Then the controller again controls the first modifying motor 52 and the second modifying motor 53 to move the standard panel 51 for modifying position deviations of the feature points, and for further indirectly modifying the position deviations of the image sensor module 10, thereby making the image sensor 12 to pick up the picture of the whole standard panel 51.

Finally, after modifying the position deviations of the image sensor 12, the image sensor 12 picks up the image signal of the picture of the standard panel 51, and transmits the image signal to the controller. The controller tests the performance of the image sensor 12 for picking up the color signals according to the image signal.

As described above, the present method and apparatus for adjusting and testing the image sensor module employ the stepper motor component 40 and the focusing motor 304 to compensate the mechanism errors produced in the mounting process of the image sensor module 10. Whereby the focusing wheel component 303 can conveniently engage with the lens 14. Therefore, the present method and apparatus can conveniently and exactly adjust the focus of the image sensor module 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for adjusting and testing an image sensor module, comprising steps of:
   (1) calculating longitudinal and transverse deviation values of a center point of a lens relative to a standard reference position specified on a lens barrel, and an angle deviation value of the lens according to position signals of the lens on the image sensor module;
   (2) compensating the longitudinal and transverse deviation values of the center point of the lens, and the angle deviation value of the lens for exactly positioning the lens; and
   (3) adjusting focus of the image sensor module.

2. The method for adjusting and testing an image sensor module as claimed in claim 1, further comprising a step of: (3-1) compensating position deviations of an image sensor of the image sensor module and testing performance of the image sensor module for picking up color signals after the step of (3).

3. The method for adjusting and testing an image sensor module as claimed in claim 1, further comprising a step of: (1-1) picking up an outside view of the image sensor module to obtain the position signals of the lens relative to the lens barrel on the image sensor module and moving the image sensor module to a focusing position before the step of (1).

4. The method for adjusting and testing an image sensor module as claimed in claim 1, wherein further comprising a step of: (1-2) picking up an outside view of the image sensor module to obtain the position signals of the lens relative to the lens barrel on the image sensor module before the step of (1).

5. The method for adjusting and testing an image sensor module as claimed in claim 4, wherein the step of (2) further comprises a step of: (2-1) moving the image sensor module to a focusing position at the same time of exactly positioning the lens.

6. The method for adjusting and testing an image sensor module as claimed in claim 2, wherein the step of (3-1) comprises following steps of:
   (4) marking feature points;
   (5) transmitting position signals of the feature points by the image sensor of the image sensor module;
   (6) calculating longitudinal and transverse deviation values of the feature points, and modifying the image sensor module according to the longitudinal and transverse deviation values of the feature points; and
   (7) testing performance of the image sensor module for picking up the color signals.

* * * * *